UNITED STATES PATENT OFFICE.

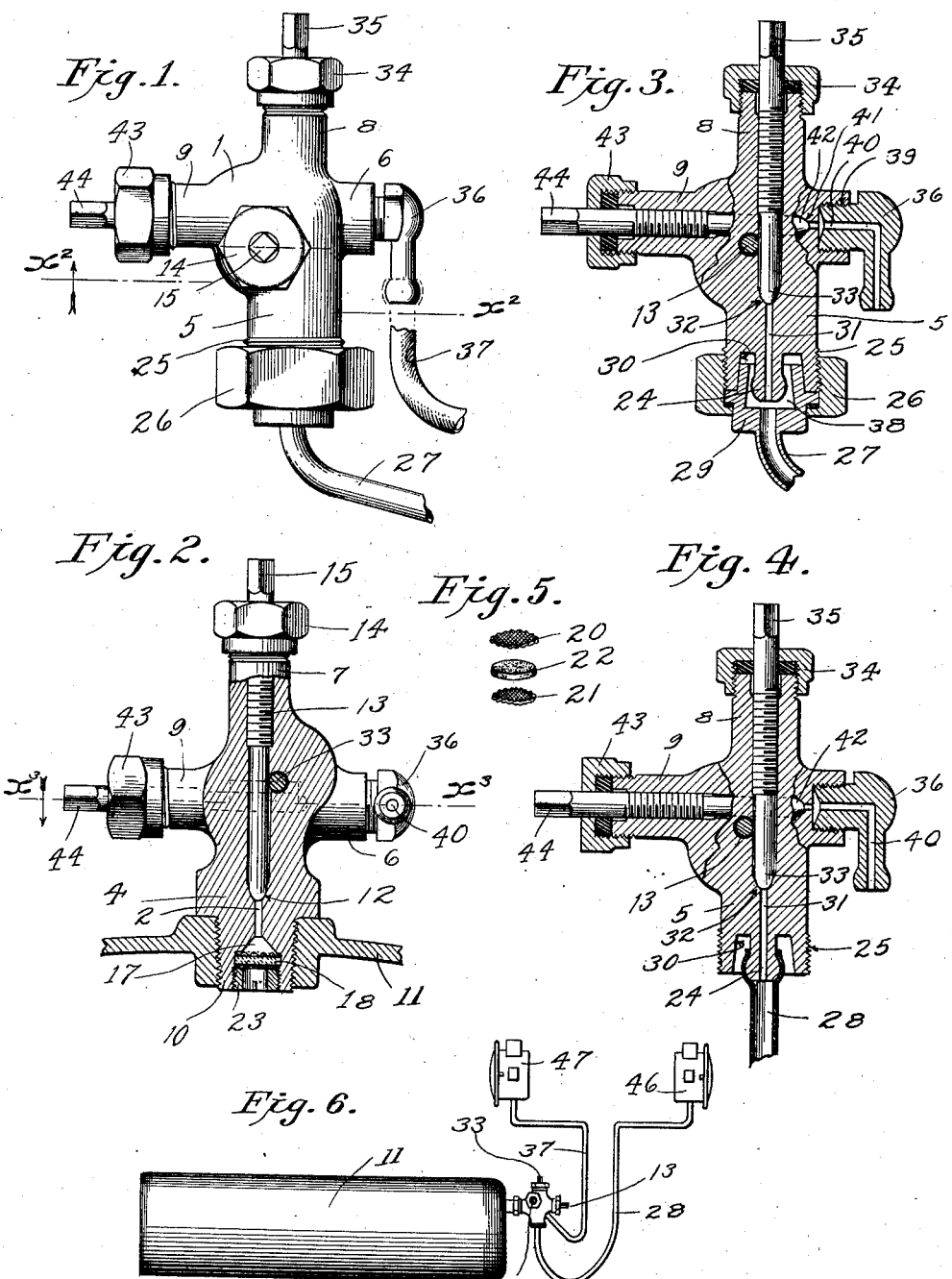

LARS L. OIE, OF SAN PEDRO, CALIFORNIA.

VALVE.

1,043,136.  Specification of Letters Patent.  Patented Nov. 5, 1912.

Application filed November 9, 1910. Serial No. 591,520.

*To all whom it may concern:*

Be it known that I, LARS L. OIE, a subject of the King of Norway, residing at San Pedro, in the county of Los Angeles, State of California, have invented a new and useful Valve, of which the following is a specification.

This invention relates to a valve particularly adapted for use in the connection of tanks for compressed gases or air with service pipes or with recharging pipes. In such cases, it is desirable to be able to make a number of alternative connections, for example, to connect the tank to one or both of a plurality of service connections or to connect the tank to a recharging connection, and one object of the invention is to provide a simple and efficient valve whereby such different connections may be made.

Another object of the invention is to provide means whereby the regulation of the flow of gas or air may be determined by one of the members of the valve and the opening and shutting of the connection may be controlled by another of said members, whereby any adjustment which has been made by the first named member of the valve may be retained indefinitely, thereby saving considerable time and trouble in the operation.

Another object of the invention is to provide a valve particularly adapted for high pressure gas work in which the liability of leakage due to the high pressure is avoided.

Another object of the invention is to provide improved means for straining the gas as it comes from the tank. This is of special importance in connection with acetylene tanks, wherein acetone is used as an absorbent medium, the straining preventing the blowing off of such liquid from the tank as well as preventing the passage of any sediment.

Other objects of the invention will appear hereinafter.

The accompanying drawings illustrate the invention, and referring thereto:

Figure 1 is a side elevation of the valve with the connections for recharging. Fig. 2 is a section on line $x^2$—$x^2$ in Fig. 1. Fig. 3 is a section on line $x^3$—$x^3$ in Fig. 2. Fig. 4 is a view similar to Fig. 3, showing the connections for double service. Fig. 5 is a perspective of the strainer. Fig. 6 is a side elevation of the valve with the tank to which it is attached and double service connections leading therefrom.

The valve comprises a body or casing 1 formed with extensions or projections 4, 5 and 6 for receiving the several connections and with other extensions 7, 8 and 9 for receiving the movable valve members for controlling the passage of fluid through such connections.

Extension 4 from the casing 1 may be formed with a screw member 10 adapted to screw into a corresponding opening in a tank 11. The casing 1 is formed with a passage 2 extending in this casing extension 4 and formed with a seat 12 for a valve 13 screwing through the opposite projection 7 on the case, said valve 13 extending through a stuffing box 14 and being provided with a wrench hold 15 at its upper end. Said passage 2 extends to a strainer chamber 17 in which is secured a strainer 18. Said strainer preferably consists of wire gauze disks 20, 21, with an intervening disk 22 of suitable porous material, preferably asbestos, and the strainer is held in place by a screw bushing 23 screwing into the lower end of the casing extension 4.

The casing extension 5 is formed with screw means 25 adapted to receive a union indicated at 26 for connection of a tubular member 27 adapted for recharging connections. The inner end of said tubular member 27 is formed with a head 29 constituting the inner member of the union nested with the nipple 24 and clamped by the collar member 26 of the union, so that the tapered inner end of said head 29 engages with a corresponding tapered recess or socket 30 in the outer end of the extension 5. A passage 31 extends in said casing to the said socket 30, this passage being formed with a seat 32 for a valve 33 screwing in the projection 8 of the casing and extending through a stuffing box 34 and provided at its upper end with a wrench hold 35. The casing extension 5 is also formed with a nipple 24, adapted to receive a flexible tube indicated at 28, in Figs. 4 and 6, this nipple extending within the recess 30, and within a recess 38 in head 29.

The projection 6 from the casing serves to receive a nipple member 36 which screws thereinto and is adapted to receive suitable connections such as flexible hose 37 for connection to service or other pipes, the socket 39 into which the member 36 screws being connected with a passage 40 having a seat 41 with which engages a valve 42 screwing in the projection 9 of the casing and extending through a stuffing box 43 and provided at its outer end with a wrench hold 44. The axes of the passages 2, 31 and 40 extend in different planes and in different directions, so that the valves 13, 33 and 42 do not interfere with one another in their operation. The said valves are shown as extending mutually at right angles to one another, this construction providing the most convenient connections. Said valves 13, 33 and 42 are preferably pin valves, the passages 2, 31 and 40 being cylindrical and slightly larger than the pins of the valves, so as to allow passage of gas alongside said pins, and the said passages being bored in the integral casting or body 1 in such manner that they intersect one another and communicate at the points of intersection. The said cylindrical passages have their axes in different planes, so that the valve pins in the several passages extend past one another without interference, each cylindrical passage however cutting through the wall of each of the other cylindrical passages at a point of intersection so as to permit passage of fluid between the several passages.

The valve is capable of numerous applications, for example, as shown in Fig. 6, the valve may be connected to the tank 11, said tank being, for example, an acetylene gas tank used for an automobile lighting system. The tubular connection is here shown as connected by the nipple 24 and hose 28 to an automobile lamp 46 and the nipple 36 is shown as connected by hose 37 to an automobile lamp 47, said lamps 46 and 47 being, for example, forward and rear lamps. The union 26 is in this case removed, said union being, for example, left on the recharging pipe 27 to which it is attached. The valve 13 here serves as a master valve, the opening thereof serving to admit the gas to the inner chamber 2, whence it may flow to either or both of the pipes 37 or 28 according to the subsidiary control by valves 33, 42. Assuming that the master valve is open, the valves 33 and 42 may be adjusted so as to regulate the intensity of the forward and rear lamps separately and this regulation having once been effected, the lamps may be turned on and off simultaneously by the master valve 13 without interfering with such regulation, so that whenever such master valve is opened, the lamps 46 and 47 will burn with the intensity for which they have been previously regulated. On the other hand if it is desired to use the valve in recharging the tank 11, a tubular connection, indicated at 27 is connected by union 26, said union 26 leading from the pipe line or source of compressed gas to the socket 30 of the valve, the valve 42 is closed and valves 13 and 33 are opened, one of said valves being opened only partially so as to retard inflow of gas as much as may be desirable. The valve body 1 being integral with the several valve portions, rigidly and hermetically connected, there is no liability of leakage such as occurs where a plurality of valves are connected by means of unions.

What I claim is:

1. A valve comprising an integral body formed with a plurality of cylindrical passages extending in different angular directions, each passage intersecting each of the other passages to establish communication between them, and a plurality of pin valves screwed in said body and extending in said passages, said passages having seats coöperating with said pin valves and having their axes in different planes so as to permit the pin valves to extend past one another to coöperate with said seats.

2. A valve comprising an integral body formed with three cylindrical passages having their axes extending at right angles to one another and in different planes, pin valves screwing in said cylindrical body and extending in said passages, said passages having seats and each of said valve pins extending past each of the other valve pins and coöperating at its inner end with the seat in the corresponding passage.

3. A valve comprising an integral body formed with three cylindrical passages having their axes extending at right angles to one another and in different planes, pin valves screwing in said cylindrical body and extending in said passages, said passages having seats and each of said valve pins extending past each of the other valve pins and coöperating at its inner end with the seat in the corresponding passage, a supply connection connected to one of said passages, and outlet connections connected to the two other of said passages, whereby the supply may be turned on or off by the valve for the supply connection and the discharge may be independently regulated to said outlet connections by the other valves.

4. A valve comprising a body formed with passages communicating with one another and valves controlling said passages, said body provided with an annular threaded flange and a nipple projecting from the body into the chamber formed by and within the flange and provided with a passage forming a continuation of one of said valve controlled passages, a rigid tubular recharging connection member having a hollow head forming a central chamber into which the end of said nipple projects, said head fitting into the chamber of said flange and a retaining union adapted to screw on to said flange, said nipple adapted for direct connection with a flexible tube when the recharging connection member is removed.

In testimony whereof, I have hereunto set my hand at Los Angeles, California, this 2nd day of November, 1910.

LARS L. OIE.

In presence of—
ARTHUR P. KNIGHT,
FRANK L. A. GRAHAM.

Copies of this patent may be obtained for five cents each, by addressing the "Commissioner of Patents, Washington, D. C."